United States Patent
Jessop

(10) Patent No.: US 7,718,884 B2
(45) Date of Patent: May 18, 2010

(54) METHOD AND APPARATUS FOR ENHANCED GAMING

(75) Inventor: Jerome S. Jessop, Foster City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 14 days.

(21) Appl. No.: 12/175,139

(22) Filed: Jul. 17, 2008

(65) Prior Publication Data

US 2010/0016079 A1 Jan. 21, 2010

(51) Int. Cl.
*G10H 1/00* (2006.01)
*G10H 1/18* (2006.01)

(52) U.S. Cl. .............. 84/615; 84/600; 84/610; 84/634; 84/650; 84/653; 84/666

(58) Field of Classification Search ........ None
See application file for complete search history.

(56) References Cited

U.S. PATENT DOCUMENTS

| | | | |
|---|---|---|---|
| 2002/0166438 A1* | 11/2002 | Nishitani et al. ............ 84/600 |
| 2003/0066413 A1* | 4/2003 | Nishitani et al. ............ 84/615 |
| 2004/0261606 A1* | 12/2004 | Suzuki et al. ............... 84/600 |
| 2005/0016362 A1* | 1/2005 | Nishitani et al. ............ 84/612 |
| 2006/0112814 A1* | 6/2006 | Paepcke .................... 84/645 |
| 2006/0185502 A1* | 8/2006 | Nishitani et al. ............ 84/615 |

* cited by examiner

*Primary Examiner*—Marlon T Fletcher
(74) *Attorney, Agent, or Firm*—Frommer Lawrence & Haug LLP; William S. Frommer; Thomas F. Presson

(57) ABSTRACT

A system for seamless integration of a handheld device, as a secondary display and input device, to remotely interact with a host device. The host device receives data from a remote location. One or more handheld devices, receive data provided by the host device. Each of the handheld devices includes one or more controllers. Each of the controllers provides control input data to the associated handheld device. The handheld devices each have one or more input modules, such as a microphone, or Wi-Fi port, to receive the control input data as well as one or more output modules, such as a display screen and/or speaker that outputs processed data, such as video and/or audio data. The output data is specific to a particular one of the handheld devices.

23 Claims, 9 Drawing Sheets

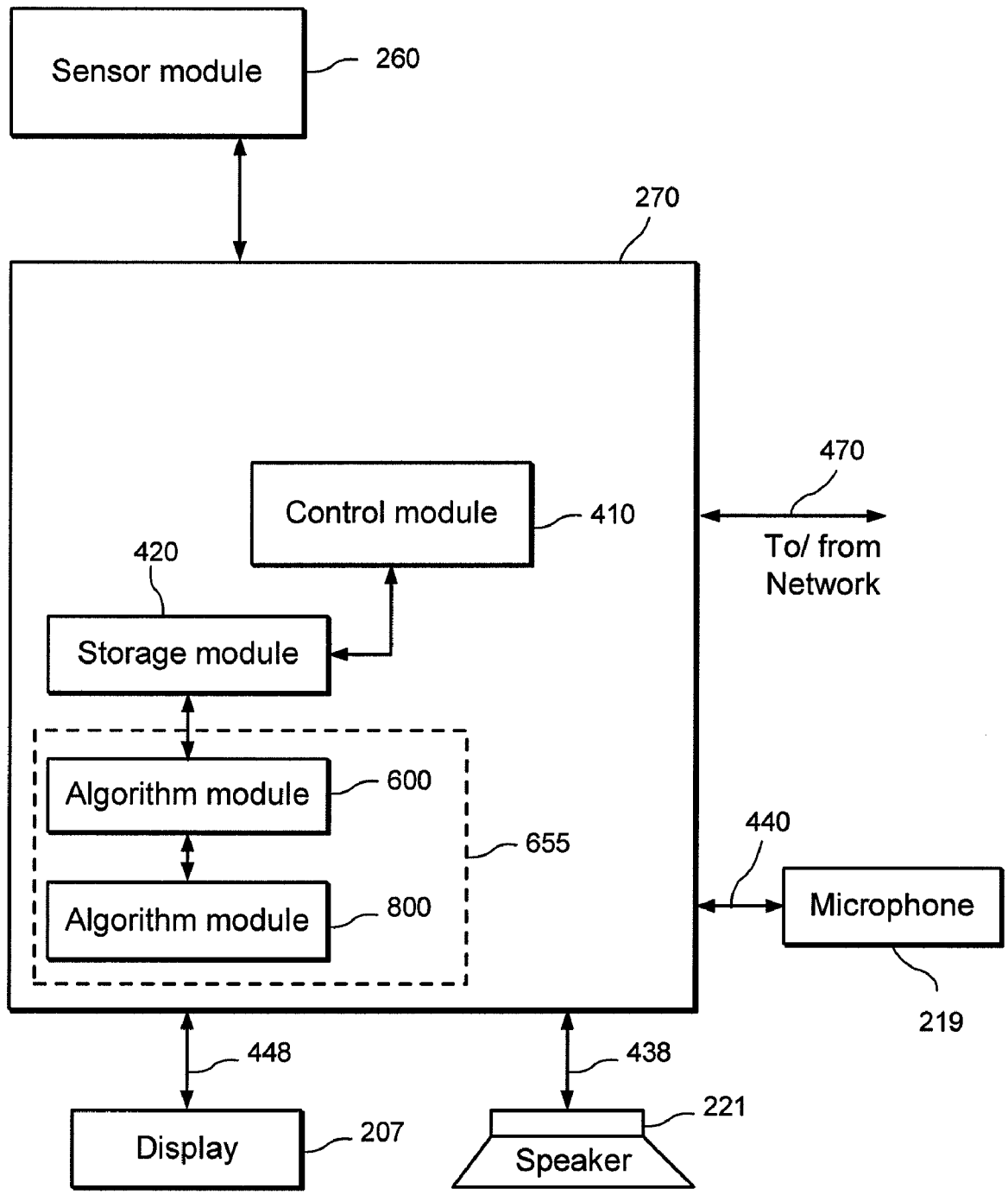
F I G. 4

METHOD AND APPARATUS FOR ENHANCED GAMING

BACKGROUND

1. Field of the Invention

This invention relates generally to a method and apparatus for enhanced gaming using a remote handheld device. More specifically, the present invention is directed to connecting a handheld device to a stand-alone device to enable the handheld device to provide enhanced game playing capabilities and display output to a particular user.

2. Background Discussion

A music video game, also commonly known as a music game, is a video game in which the gameplay is oriented around the player's interactions with a musical score or individual songs.

For example games such as Guitar Hero® and Rock Band® are currently available.

Guitar Hero® is a music video game that uses a guitar-shaped peripheral to simulate the playing of music, represented on a display screen by colored notes that correspond to fret buttons on a controller. The game supports individual play as well as cooperative and competitive modes for two players.

Rock Band® uses many gameplay elements from Guitar Hero®. Indeed, Rock Band® players use peripherals modeled after musical instruments to simulate the performance of music. Players play these instruments in time with musical "notes" that scroll on a screen. Rock Band® expands upon Guitar Hero® by offering gameplay for drums and vocals, in addition to lead and bass guitars. The game features a single-player career mode for three of the instruments (lead guitar, drums, and vocals) called "Solo Tour Mode," as well as a band career mode for 2-4 local players called "Band World Tour."

Typically, when more than one person is playing an interactive electronic game, such as a music video game, it may be a distraction for all the players to attempt to view a display screen at the same time.

Furthermore, when the game provides instruction, such as learning a musical instrument or sport, the inability for a user to have specific output displayed to them detracts from the experience. This also applies to users who only wish to view particular portions of the output on their associated handheld device.

Thus, it would be an advancement in the state of the art to enable multiple users of a gaming system to be able to have their associated device provide output and display information particular to the individual user. This prevents a display screen from becoming cluttered with data that is not relevant to a user.

SUMMARY

Accordingly, the present invention is directed to a method and apparatus that enhances a gaming experience of a portable device, such as a PLAYSTATION® PORTABLE (PSP®) handheld gaming system and facilitates interconnection of the portable device such as the PSP® to a host device, such as a PLAYSTATION® 3 (PS3™) to enhance the game playing experience. The PSP® device may be used for self instruction, or to interact with other users utilizing a similar device, typically from a remote location. This interaction between users may relate to a sport (tennis, golf, hockey, badminton), musical instrument (guitar, flute, drum, saxophone, trumpet, trombone), or other activity in which hand placement or motion can be sensed and/or directed and multiple users may wish to interact so as to simulate a band, team or other coordinated activity. Some examples of embodiments of the present invention are described.

One embodiment of the present invention is directed to a system that includes a first module, such as a host device (for example a PS3™ device) that receives data from a remote location. One or more second modules, such as a handheld device (PSP®), receives data provided by the first module (PS3™) and processes data. Each of the second modules (PSP®) includes one or more controllers, coupled to an associated second module (PSP®). Each of the controllers provides control input data to the associated second module (PSP®). The second modules (PSP®) each have one or more input modules, such as a microphone, or Wi-Fi port, adapted to receive the control input data as well as one or more output modules, such as a display screen and/or speaker that outputs processed data, such as video and/or audio data. The output data is specific to a particular one of the one or more second modules (PSP®) based on the control input data received from the associated controller.

Another embodiment is directed to the system described above in which the second modules (PSP®) transmit signals to the first module (PS3™).

Yet another embodiment is directed to the system described above in which the transmission of signals is via a wireless connection or a wired connection.

Yet another embodiment is directed to the system described above in which the input module receives the control input data via a wireless connection between the controllers and the second modules (PSP®).

Yet another embodiment is directed to the system described above in which the input module is a wired port.

Yet another embodiment is directed to the system described above, wherein the controllers are motion sensitive and the control input data is a function of sensed motion.

Yet another embodiment is directed to the system described above, wherein the input from the first module (PS3™) to the second modules (PSP®) is via a wireless link.

Yet another embodiment is directed to the system described above, wherein the input from the first module (PS3™) to the second modules (PSP®) is a representation of musical notes.

Yet another embodiment is directed to the system described above, wherein the representation of musical notes corresponds to music selected from the group consisting of guitar music and drum music.

Yet another embodiment is directed to the system described above, and also includes a supporting unit, such as a cradle, that supports the second modules (PSP®).

Yet another embodiment is directed to the system described above, wherein the supporting unit is adapted to swivel from a first position, such as a horizontal position, to a second position, such as a vertical position, the second position being perpendicular to the first position.

Yet another embodiment is directed to the system described above wherein the output modules include a display screen.

Yet another embodiment is directed to the system described above, wherein the display screen has zooming functionality.

Yet another embodiment is directed to the system described above, wherein the one or more output modules includes a speaker.

Yet another embodiment is directed to the system described above, wherein the one or more output modules includes a wireless port.

Yet another embodiment is directed to the system described above, wherein the one or more input modules includes a microphone.

Yet another embodiment is directed to the system described above, wherein the one or more input modules includes a Wi-Fi port.

Yet another embodiment is directed to the system described above, wherein the one or more second modules store data.

Yet another embodiment is directed to the system described above, wherein one or more output modules, such as a display screen, output display data at an orientation specified by the first module.

Yet another embodiment is directed to a system that includes a first module, such as a host device that receives data from a remote location. One or more second modules, such as a handheld device, receive data provided by the first module. One or more controllers, such as a representation of a musical instrument or sporting apparatus, are coupled to an associated second module. Each of the controllers provides control input data to the associated second module. The second modules each have one or more input modules, such as a microphone and/or Wi-Fi port, that receives the control input data. The second modules each have one or more output modules, such as a display screen and/or speaker, that outputs data, such as audio/video data, that is specific to a particular one of the second modules based on the control input data received from the associated controller. The second modules transmit signals to the first module via a wireless transmission link.

Yet another embodiment is directed to a system that includes a first module, such as a host device that receives data from a remote location and/or remote device. One or more second modules, such as a handheld device receive data provided by the host device. One or more controllers are coupled to an associated handheld device, each of the one or more controllers provide control input data to the associated handheld device. The handheld devices each have one or more input modules, such as a microphone and/or Wi-Fi port that receive the control input data. The handheld devices each have one or more output modules, such as a display and/or speaker, to output data, such as audio/video data, that is specific to a particular one of the handheld devices and is based on the control input data received from the associated controller. The handheld devices transmit signals to the host device via program code stored on the handheld devices.

Yet another embodiment is directed to the system described above, wherein the host device determines operation of the handheld devices.

Yet another embodiment is directed to the system described above, wherein the one or more output modules include a display unit.

Other embodiments of the present invention include the methods described above as well as an apparatus as well as program code stored on a computer-readable medium to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 4 shows a block diagram of a processing module that may be used with the present invention;

DETAILED DESCRIPTION

Figure 1:
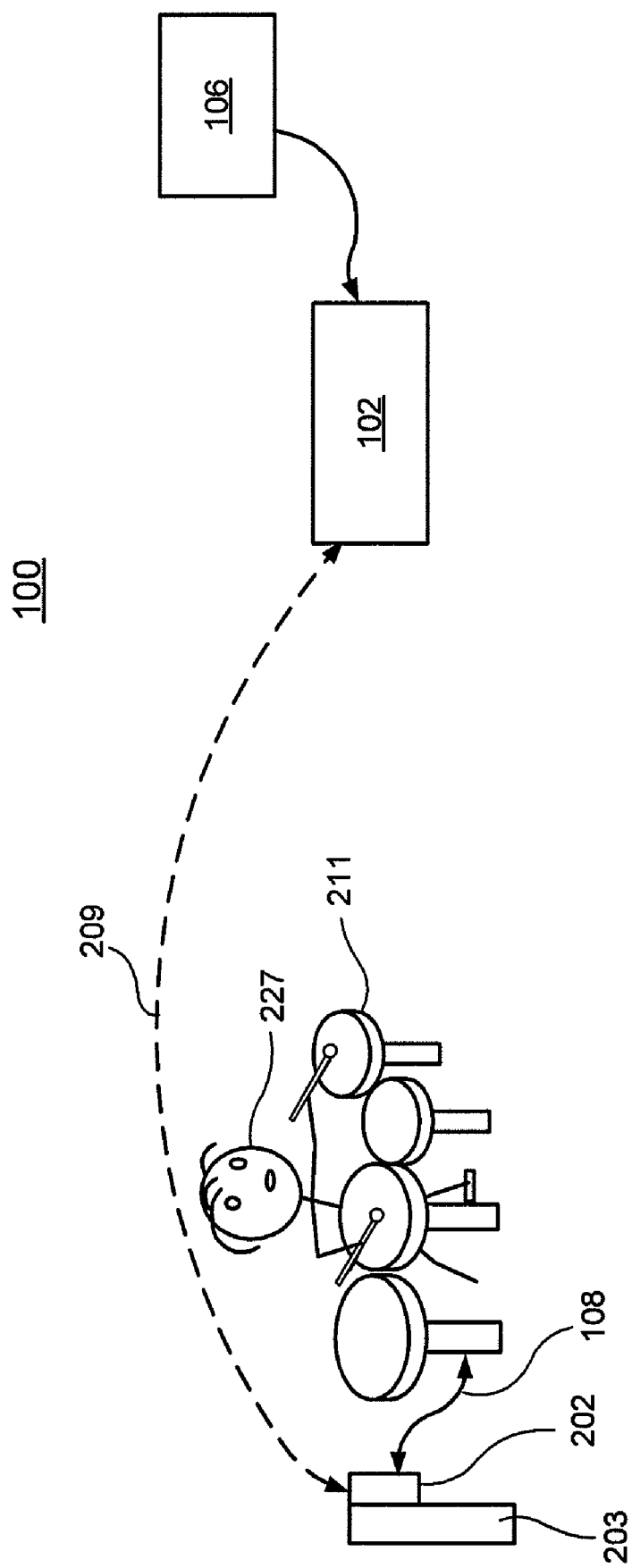
FIG. 1 illustrates a perspective view of a system including a host device and a secondary device according to the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention is directed to connecting a handheld device, such as a PSP®, to a stand alone accessory, such as a drum set, guitar, sporting apparatus or facsimile thereof, to assist or enhance the parent applications gameplay in conjunction with a host device, such as a PS3™, via remote play or remote screen mode. In order to provide illustrative examples, embodiments of the present invention are described in terms of a PSP® PS3™ and related peripherals. However, the use of such illustrative examples is for increased understanding and it is contemplated that other devices, apparatus, modules and facilities could be used.

Furthermore, embodiments of the present invention are described using a musical instrument as an example of a peripheral accessory device. However, other accessories, such as sporting apparatus, may also be used.

It is an embodiment of the present invention that a PSP® device is attached, either horizontally or vertically, to a controller, such as a drum set or other stand alone device. The PSP® device is docked such that the screen of the PSP® device is used as a remote display for a separate player (i.e., drummer) and the controller (i.e., drum device) is connected to the PSP® device via a remote command input port or USB port. In a Wi-Fi transmission mode, this permits a particular user to have his/her own personal display and input device (PSP® device) and/or a separate track display. Thus, a user will not be subjected to a cluttered screen display that includes data that is not relevant to the particular user.

Thus, an embodiment of the present invention permits seamless integration of the PSP® device as a secondary display and input device to remotely play, or via game sharing, the primary host game. Additional players may participate in a local and/or networked game session as if connected to the host display and console (such as a PS3™). The additional user data can be displayed on their associated screen, via the PSP® device and Wi-Fi.

In embodiments of the present invention, the host device, such as a PS3™ device may render data to the PSP® device, via a wired or wireless connection. The PS3™ device may be coupled to the PSP® device via an electrical connection, network connection (wired and/or wireless), software, or other connection technique. The PS3™ device may be executing software and has an associated PSP® device that displays the output of the PS3™ device. The PS3™ device may provide graphic data, audio data and or video data to the PSP® device. Alternatively, the PSP® device may interact with the host device by receiving and/or transmitting data to the host device. The PSP® device may be processing and/or acquiring and/or accessing data that is transmitted to the PS3™ device.

FIG. 1 illustrates a perspective view of a system 100 including a host device 102 and a secondary device 202, and a musical instrument representation 211 according to the present invention.

The host device 102 may be, for example, a PlayStation 3 (PS3™) module, or other processing module with sufficient data processing, memory and connectivity (wireless, wired) capability. The PlayStation 3 uses a Cell microprocessor as its Central Processing Unit (CPU). Graphics processing is performed by an NVIDIA RSX "Reality Synthesizer", which can output resolutions from 480i/576i SD up to 1080p HD. The PlayStation 3 also has 256 MB of XDR main memory and 256 MB of GDDR3 video memory for the RSX. The PS3™ system has Bluetooth 2.0, Gigabit Ethernet, USB 2.0 and HDMI 1.3a built in. The host device 102 may be coupled to another peripheral device 106, such as a television or a set top box.

Secondary device 202 is typically a handheld device and may be, for example, a PlayStation Portable (PSP®), or any other processing module with sufficient data processing, memory and connectivity (wireless, wired) capability. For example, the PSP® includes a large viewing screen, robust multi-media capabilities, and connectivity with the PlayStation 3 (PS3™), other PSP® devices, and the Internet.

The PSP® uses a 333 MHz MIPS R4000 (32-bit) CPU, a Graphics Processing Unit (GPU) with 2 MB onboard VRAM running at 166 MHz, and includes 32 MB main RAM and 4 MB embedded DRAM.

The PSP® typically may include an 1800 mAh battery that will provide about 4-6 hours of gameplay, 4-5 hours of video playback, or 8-11 hours of audio playback.

The PSP® Internet Browser is an embedded microbrowser that supports most common web technologies, such as HTTP cookies, forms, as well as basic Java Script capabilities.

The secondary device 202 is coupled to the host device 102 via a wireless or wired connection 209. The connection 209 is shown in FIG. 1 as a bi-directional wireless connection adapted to transmit data, between host device 102 and secondary device 202.

The secondary device 202 is supported by a support member 203, which may include a cradle or other holding mechanism that holds the secondary device 202 in either a vertical or horizontal position, or angled position. The support member 203 may also hold the secondary device 202 in any desired orientation, which does not need to be exactly horizontal or exactly vertical; but may include substantially any angle. The cradle may include a swivel to facilitate movement of the device 202.

The cradle, or support member 203 may also position the secondary device 202 based on control signals received from the host device 102.

A stand alone accessory device 211, shown as a drum controller, provides control data to the secondary device 202, via connection medium 108, which may be wired or wireless. The secondary device 202 has multiple ports (described in more detail with reference to FIG. 2) that permit wired and/or wireless communication. A user 227 can provide data to the accessory device 211, which can sense input data, such as touch data and provide the sensed data from accessory 211 to secondary device 202. While the accessory device 211 is shown as a drum set, it may also may be any sports equipment or musical instrument, or object that is held in a user's hands, or operated by a user or adapted to sense user motion or touch.

The accessory device 211 may be a facsimile of an actual instrument or sporting equipment or alternatively an actual instrument or sporting equipment. The accessory device may also have sensors that detect user motion or touch and provide the user generated motion/touch data to the secondary device 202.

Figure 2:
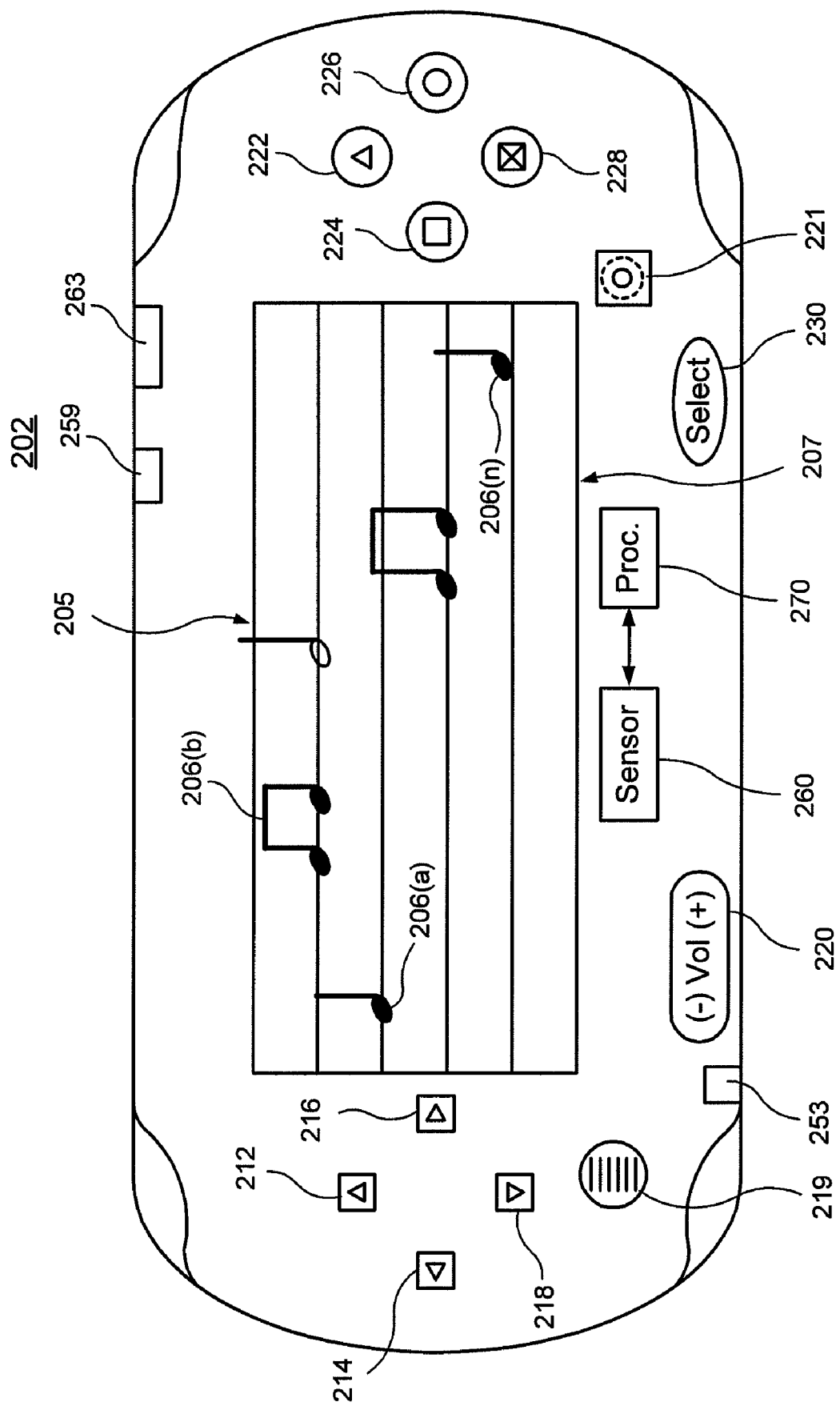
FIG. 2 illustrates one example of a display on a handheld device according to the present invention.

Turning to FIG. 2, it is seen that FIG. 2 illustrates one example of a display on a secondary device, or handheld device, 202 according to the present invention.

Device 202 has a display screen, or display unit, 207, which may display output from apparatus 202 that includes musical representation. The display unit 207, may be, for example, a CRT, LCD (liquid crystal display), a plasma screen, a graphical user interface (GUI) a touch sensitive screen, or surface or other module adapted to display output data typically by a representation of pixels. The display device 207 has zooming (in and out) functionality to provide flexibility in the display of data. The display 207 also has scrolling capabilities, actuated by buttons 212, 218, 214 and 216.

The display unit 207 and secondary device 202 may coupled to another CPU (not shown), processor (not shown), or computer (not shown), such as a desktop computer, which can provide further storage and/or processing functionality.

The display screen 207 is for example, an overlay or a pointing device that enables the user to view data, such as musical notes 205. Musical notes 205 are shown as drum sheet music; but may be other music data, or other displayed data. The music data 205 includes notes 206(a) ... (n) (where "n" is any suitable number).

Microphone 219 is used to input data based on sounds generated by a user (user shown as 227 in FIG. 1) playing the drums (drums shown as 211 in FIG. 1). The user (227 in FIG. 1) generates music by touching the surfaces of the drums. The touching is sensed either by sensors on the drums (211) or sensor 260 of device 202.

Furthermore, an audible signal can be generated by processor 270 that corresponds to the user playing the drum representation, or actual drums. Thus, whatever a user is playing on the drums (211), a corresponding signal will be produced thereby permitting a user to hear how such playing would sound on an actual instrument. Speaker 221 outputs the musical representation of what the user is playing.

A sensor unit 260 and CPU, also referred to as a processor, 270 as well volume setting 220, select module 230, control buttons 222, 224, 226 and 228 and directional controls 212, 214, 216 and 218 are shown on device 202.

The secondary device 202 also has a remote command port 253 that is used for displaying data generated by a user playing the instrument, inputting data received from another device, such as a host device, another secondary device, such as a PSP® device or a remote device or a local device. The remote command port 253 may also map non PSP native controls.

A wired port 259 is used to transmit and/or receive data via a wired communication medium, such as an IEEE1394 bus, USB, or other communication line.

A wireless port 263 is used to send and/or receive data via wireless communication medium (shown as 209 in FIG. 1), such as an IEEE 802 network. The wireless port 263 may also be built into the console and used for data reception/transmission.

It is also an embodiment of the present invention that the secondary device 202, such as PSP® may retrieve, or download, or access data independent of the host device. For example the PSP® is Internet compatible and thus may access desired data from remote processing locations and remote devices.

The device 202 may also include a camera, not shown, to obtain image data. This image data may be transmitted to another device.

Figure 3:
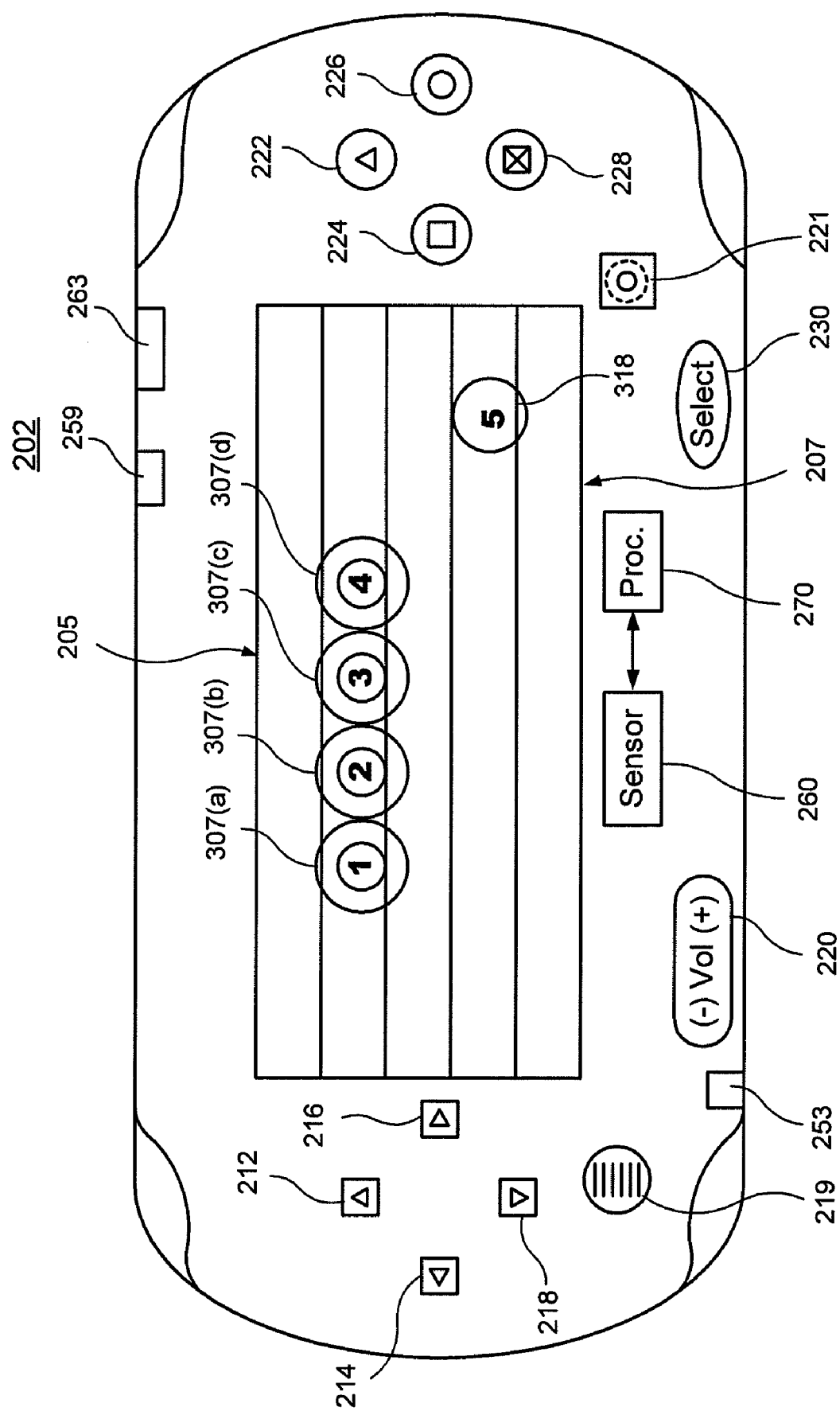
FIG. 3 illustrates another example of a display on a handheld device according to the present invention.

FIG. 3 illustrates another example of a display 207 on a handheld device 202 according to the present invention. FIG. 3 is similar to FIG. 2 and further shows that the musical notes are shown as indicators on the appropriate corresponding drum surface. The music data 205 reflects a visual representation of where the user is direct to touch. This embodiment is useful for users who do not read music; but merely follow a position as to what drum to play and when. As shown in FIG. 3, 307(a) . . . (d) represent the four drum surfaces of a drum set (211). The screen 207 has the ability to display and receive information. The display screen 207 includes a representation of proper placement indicators "1" for 307(a) "2" for 307(b), "3" for 307(c) and "4" for 307(d). Numeral "5" 318 represents that the kick pedal should be used. These proper placement indicators represent correct placement of a user's to play a particular drum section of a musical composition.

The indicators "1"-"5" can be illuminated based on predetermined placement data, which may be stored in unit 270 provided in apparatus 202. The device 202 can sense a user's pressing on the surfaces of the drums (211), via sensor module 260 and/or microphone 219 provided in apparatus 202, and compare the sensed position to the proper location, via processor unit 270, also referred to as CPU module herein. An illumination signal can be provided by LEDs (light emitting diodes) and visible on display screen 207 to indicate the proper playing.

A determination may be made whether the actual play matches the proper notes.

Furthermore, an audible signal can be generated that corresponds to the drumming by a user, if a user were playing an actual drum. Thus, whatever a user is playing, a corresponding signal will be produced permitting a user to hear how such playing would sound on an actual instrument.

The other elements of FIG. 3 have been previously discussed in relation to FIG. 2 and are illustrated for purposes of completeness.

FIG. 4 shows a block diagram of a processing module that may be used with the present invention. The processing module includes sensor module 260 and CPU module 270. The sensor module 260 is, for example, a pressure or motion sensor device that contains a physical mechanism or electronic sensor that quantifies motion that can be either integrated with or connected to other devices. The sensor module 260 is used to sense motion of a user and/or pressure of a drumstick, user's hand and/or fingers or other pressure or motion and provide the sensed data to CPU module 270.

CPU module 270 includes a control module 410 storage module 420 and algorithm storage module 655. CPU module 270 is operatively coupled to display unit, or display screen, 207, speaker 221 and microphone 219, via interconnection media 448, 438, and 440, respectively.

The control module 410 provides processing functionality and is in bidirectional communication with sensor module 260 and storage module 420 to retrieve process and transmit data. The control module 410 may control downloading of data, such a game data, from a host device and play the game when the secondary device is "offline". The control module 410 is typically a processor that includes an arithmetic logic unit (ALU), which performs arithmetic and logical operations, and a control unit (CU), which extracts instructions from memory and decodes and executes them, utilizing the ALU when necessary. An I/O interface is used to operatively couple the components of CPU module 270.

The control module 410 may also be connected to a network to retrieve data, via connection medium 470, which may be a bus, wireless connection or DSL cable. This network, such as the Internet, Ethernet, or other network of operatively coupled computers, processors, or output devices can be a source of music data, or other data accessed by the secondary device (202). The connection medium 470 may also be coupled to one or more of the ports shown in FIG. 2 (remote command port 253, wired port 259 and/or wireless port 263, that provides wireless signals shown as 209 herein). The wireless and wired ports (263, 259, shown in FIG. 2) are used to connect the secondary device 202 to a network (which is shown in relation to FIG. 7), such as the Internet, or any other interconnected processing devices. The network may be a wired network and/or wireless network.

An example of a wired network, which is a network that uses communication busses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems which enables connection to the Internet or other machines that have Wi-Fi functionality. Wi-Fi networks broadcast radio waves that can be picked up by Wi-Fi receivers that are attached to different computers.

Storage module 420 and algorithm module 655 (including algorithm module 600 and algorithm module 800 are electronic storage media that can store data used by system CPU module 270. The memory modules 420 and 655 may include, for example, RAM, ROM, EEPROM or other memory media, such as an optical disk, or a removable cartridge, on which digital information is stored in the form of bits. Alternatively, the electronic storage functionality may be performed by a remote memory coupled to CPU module 270 via wired or wireless bi-directional communication medium.

The storage module 420 may be used to store a user's playing such that it can be transmitted to another device or played back at a later time.

Figure 5:
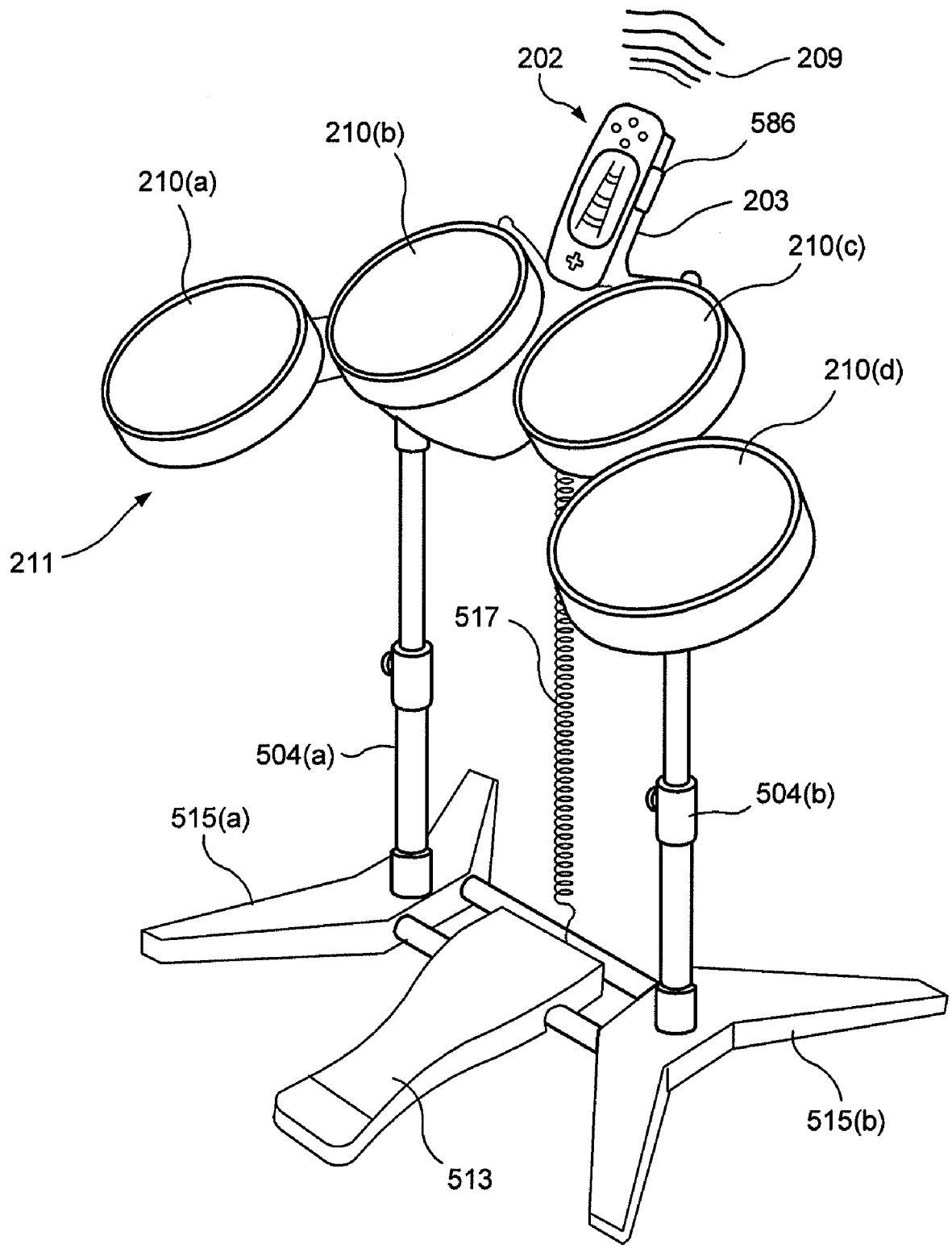
FIG. 5 shows an embodiment of the present invention that uses a drum set as the controller.

FIG. 5 shows an embodiment 500 of the present invention that uses a drum set as the accessory device, or controller. The drum set 211 includes drum pads 210(a) . . . (d), secondary device 202, cradle 203, support members 504(a) and (b), foot pedal 513, tilt sensor 586 and cord 517. The secondary device 202, such as PSP®, or other suitable handheld or processing device, may be mounted in cradle 203 at a desired orientation, such as horizontal, vertical or at any desired angle. The cradle 203 may be a mechanical holder with a DC power inlet from a host USB (Universal Serial Bus) or stand alone and/or serial data via the remote commander port input. The screen (207 shown in FIG. 2) of device 202 displays music notes, or other representation.

The drum controller 211 features four rubber drum pads 210(a) . . . (d) and a kick pedal 513. The pads (generally 210) may have colored rings around the edges that correspond to the notes on-screen of device 202, representing the snare drum (red), tom-tom (blue), hi-hat (yellow), and crash cymbal (green). The kick pedal 513 simulates the bass drum. On-screen notes may be represented as orange horizontal lines. To use the drum controller, players strike the pads 210 with a drum stick or hand, and/or press the kick pedal 513 in time with the scrolling notes on-screen. The device may also display representations of the four drum pads and light a particular LED of the drum pad the user should hit.

Alternatively, device 202 may display sheet music data for the user to follow.

Secondary device 202 has been described previously is typically a handheld device and may be, for example, a PlayStation Portable (PSP®), or any other processing module with sufficient data processing, memory and connectivity (wireless, wired) capability.

Cradle 203 supports the secondary device and may include a swivel that permits virtually any orientation of the secondary device relative to the user, e.g., horizontal, vertical, angled etc. The cradle 203 may be in communication with a host device (not shown) such that the host device can provide control signals to the cradle 203 with respect to the orientation of the device 202.

Support members 504(a) and (b) (generally 504) may be used to support the drum pads 210. The support members 504 may be adjustable or removable to enable a user to position the drum pads 210 as desired. Base portions 515(a) and (b) provide stabilization to the support members 504.

Tilt sensor 586 is mounted on the secondary device 202 and detects an orientation of the secondary device. The tilt sensor 586 can be adapted to provide the sensed orientation data to the secondary device 202 and/or host device (shown as 102 in FIG. 1). The position/orientation of the secondary device 202 may be adjusted based on the sensed orientation.

Cord 517 provides a transmission path for output from kick pedal 513 to device 202. As shown in FIG. 2, device 202 includes a remote command port (253) wireless port (259), wired port (263), microphone 219 and speaker 221.

A wireless port (shown as 259 in FIG. 2) of device 202 is adapted to receive data from the host device (shown as 102 in FIG. 1). This data may be screen data for the secondary device 202 from the host device (102). The data may be transmitted as Wi-Fi signals 209 according to IEEE standard 802.11. The wireless port may also be used to transmit data from the secondary device 202 to a remote location. This data may include a representation of the music being played on drum pads 210.

A wired port (shown as 263 in FIG. 2) of device 202 may also receive and/or transmit data, such as screen data, musical data and other data.

A remote command port (shown as 253 in FIG. 2) of device 202 inputs external data from the accessory, in this example, drum pads 210 and kick pedal 513. The remote command port (253) is connected to the accessory 211 and receives data from the accessory. In this embodiment, the remote command port receives music data based on a user playing the drums by touching the drum pads 210 and kick pedal 513.

An audio output (shown as speaker 221 in FIG. 2) of device 202 provides output signals, such as audio signals representing the music played by the user playing drums 211 (including drum pads 210 and kick pedal 513).

A microphone (shown as 219 in FIG. 2) of device 202 can be used to input audio signals. The signals can represent the music being played by a user striking drum pads 210. Also, the microphone 219 can be used to provide voice data of a user to another secondary device. The voice data input at a microphone of a first secondary device can be output at the speaker of a second secondary device. Thus, users can carry out a conversation.

Furthermore the microphone is also capable of obtaining voice data that may be used by processor 270 for voice recognition.

The drum pads 210 are touch sensitive and are adapted to detect a user playing the drums. A comparison can be made between the sensed data and the musical notes to determine how closely the user is replicating the displayed musical notes, or instructions.

Figure 6:
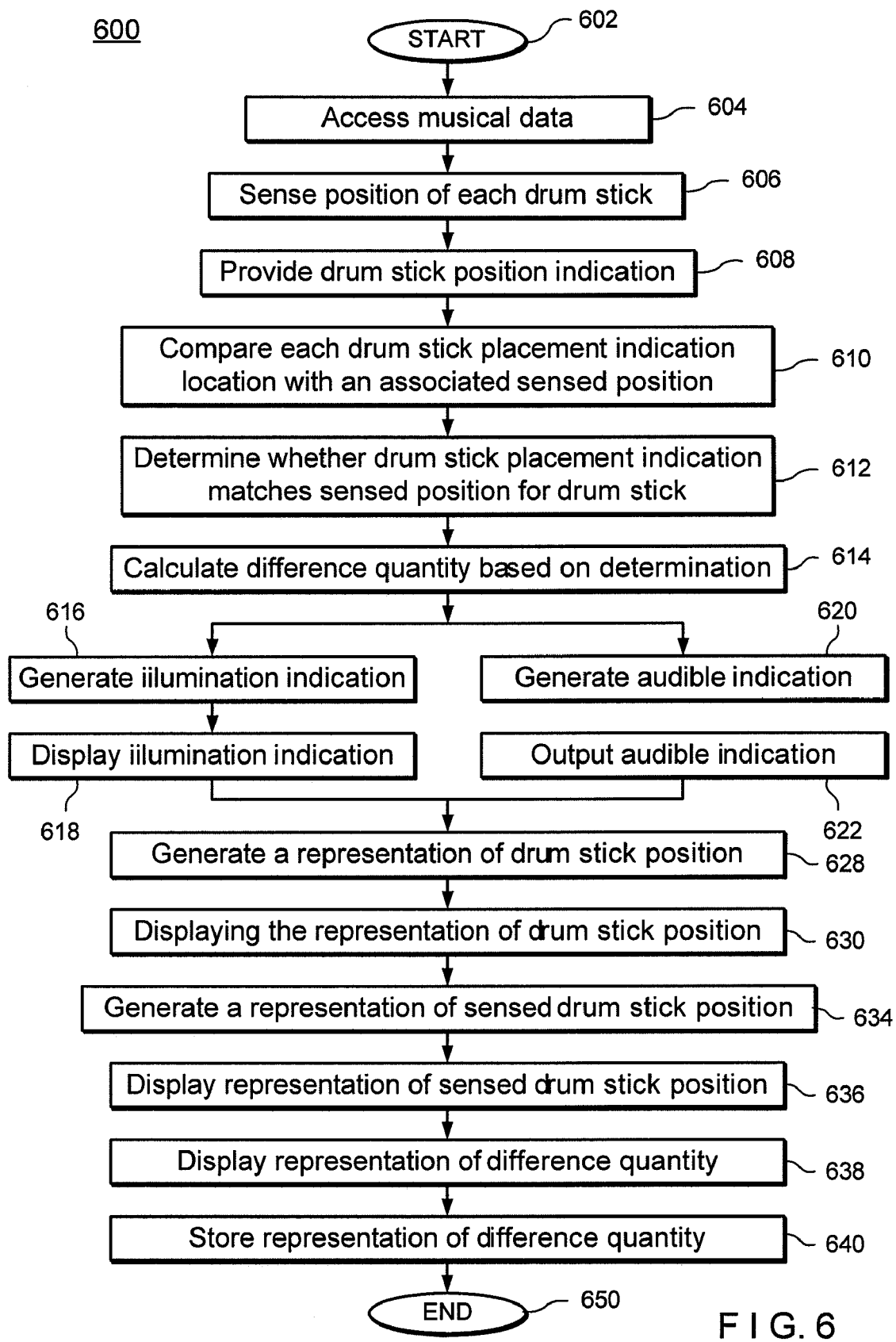
FIG. 6 shows a flowchart of steps to implement an embodiment of the present invention.

FIG. 6 shows a flowchart of steps 600 to implement an embodiment of the present invention. The steps 600 may be executed by a processor, or otherwise executed to perform the identified functions and may also be stored in one or more memories. For example, the steps of FIG. 6 may be stored on a computer-readable medium, such as ROM, RAM, EEPROM, CD, DVD, UMD or other non-volatile memory. The program code stored on an electronic memory medium is a structural element.

The process 600 begins with start step 602. Musical data is accessed, as shown in step 604. The musical data may be musical notes or may be an indication of a sequence of drums to be played. The musical notes comprised of sheet music will be useful to users who are able to read sheet music while the sequence of drums to be played will be useful to users who are not able to read sheet music but can follow the indicated sequence. The musical data is typically stored on an electronic medium and represents recorded, or digitally generated representations of sheet music and/or sequence representations of drums to play. The screen data accessed, typically from a host device, may include proper playing technique on an instrument or proper hand placement on an object, such as a golf club, tennis racquet or other equipment.

In this example that uses drum playing, the placement of a drum stick or hand is sensed as shown in step 606. This may be achieved by one or more sensors disposed on the drum pads (210) or the secondary device (202) to sense, via pressure and/or motion, where a drum stick and/or hands are located on the drum pads (210). The use of the kick pedal may also be sensed. A drumstick placement indication is provided, as shown in step 608. This is typically an indication, such as a light, visible on a display screen that indicates where a drumstick should be positioned to correspond to the proper location. A comparison is made of each sensed drumstick position (where the user's drumstick actually is) and the placement indication location (the proper location for the drumstick), as shown in step 610, to determine whether the sensed drumstick placement on the object matches the proper placement, as shown in step 612.

A difference quantity is calculated, as shown in step 614. This difference quantity represents the difference between the proper location of the drumstick and the sensed location of the drumstick. If the difference quantity is less than a predetermined threshold the sensed position will be deemed equal to the proper location.

An illumination indication may be generated, as shown in step 616 and displayed, as shown in step 618. Also an audible indication may be generated, as shown in step 620, and output, as shown in step 622. Step 628 shows that the representation of drumstick placement may be generated and displayed, as shown in step 630. This represents where the drumstick should be to properly play the particular piece.

Step 634 shows that a representation of sensed drumstick placement may be generated and displayed (step 636). This represents where the drumsticks are on the drum pads. The difference quantity may be displayed (step 638) as well as stored (step 640). Thus, as a user repeats a piece the user will be able to have a visual indication of improvement because the difference quantity should become smaller. Step 650 shows the process ends.

Figure 7:
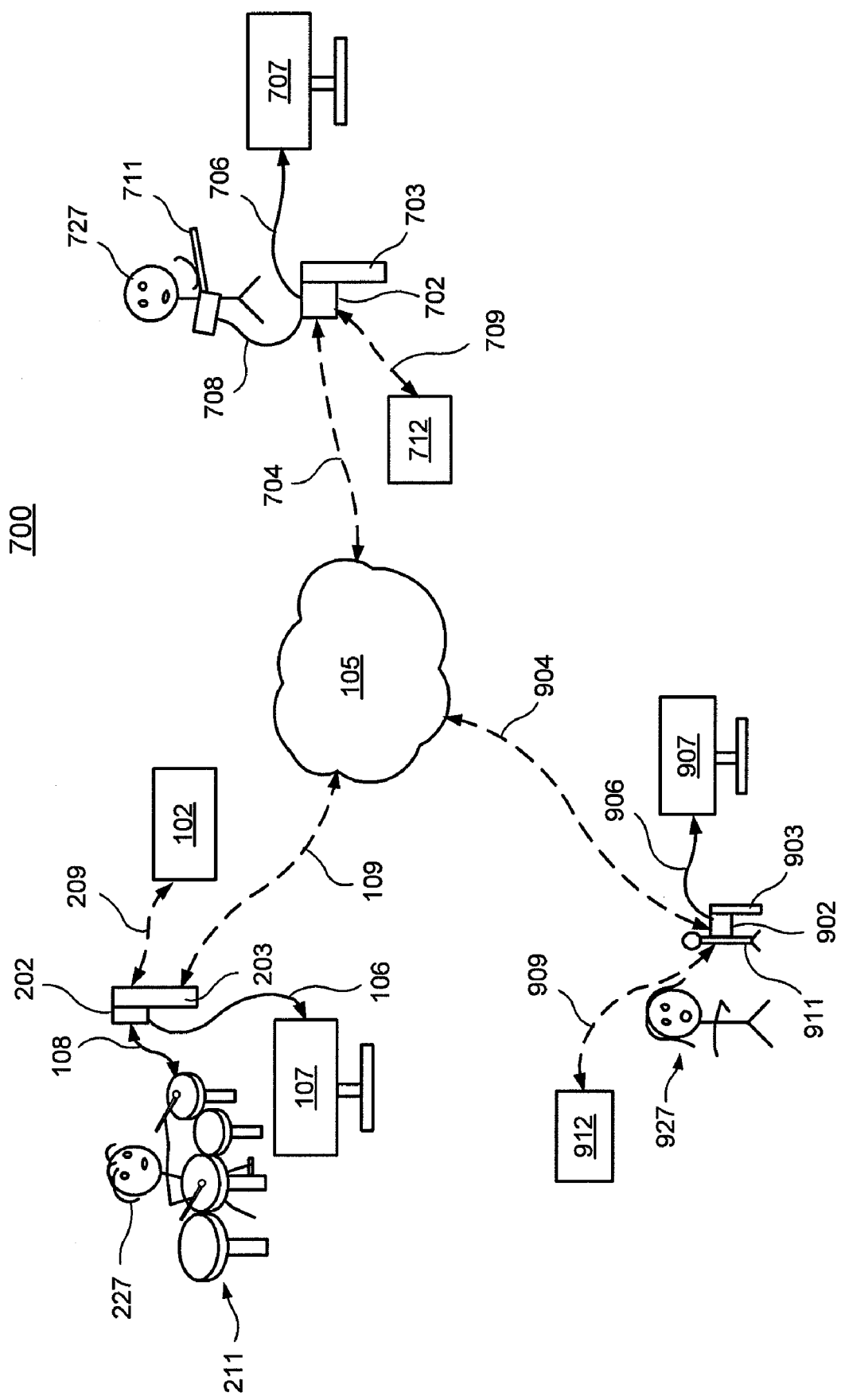
FIG. 7 shows a view of multiple users interacting using multiple handheld devices.

FIG. 7 shows a view of a system 700 in which multiple users interact using multiple handheld devices. As shown in FIG. 7, three users 227, 727 and 927 each can generate data, such as audio and/or video data that can be shared between users 227, 727 and 927. As shown in FIG. 7, user 227 plays the drums 211, user 727 plays guitar 711 and user 927 is on vocals 911.

A first user 227 is typically located at a first location and plays drums 211. The music data for user 227 is displayed on device 202, which is supported by cradle 203. Device 202 is adapted to receive music data from host device 102. Furthermore, a display screen 107 is a display screen that can replicate the information displayed on display screen of device 202 (207 in FIG. 2) or data displayed on other users devices. The device 202 is coupled to display screen 107 via connection 106. Device 202 can transmit and receive data to host device 102 and network 105, via bidirectional communication medium 209 and 109, respectively.

Communication medium 108 provides a path for signals generated by user 227 to reach device 202.

Similarly, a second user 727 plays guitar 711 at a second location. The second user may be at the same location as first user 227 or a remote location. The second user 727 also has a secondary device 702, such as a PSP®, coupled to a host device 712, such as a PS3, via bidirectional communication medium 709, which may be wired or wireless. Cradle 703 supports device 702. Device 702 can transmit/receive data from host 712, via communication medium 709 and transmit and/or receive data via network 105, via bidirectional communication medium 704, which may be wired or wireless. Furthermore, a display screen 707 is a display screen that can replicate the information displayed on display screen of device 702 or display screen 107 or display screen 907. The device 702 is coupled to display screen 707 via connection 706. Communication medium 708 provides a path for signals generated by user 227 to reach device 202.

A third user 927 sings vocals 911 at a third location. The third user 927 may be at the same location as first user 227 and/or the second user 727, or a remote location. The third user 927 also has a secondary device 902, such as a PSP, coupled to a host device 912, such as a PS3, via bidirectional communication medium 909, which may be wired or wireless. Cradle 903 supports device 902. Device 902 can receive data from host 912 and transmit and/or receive data via network 105, via connection medium 904. Furthermore, a display screen 907 is a display screen that can replicate the information displayed on display screen of device 902. The device 902 is coupled to display screen 907 via connection 906.

It is also an embodiment of the present invention that individual users 227, 727 and 927 may store their particular rendition and other users, who may be part of a band, can access the stored rendition and add their rendition to the stored rendition. Thus, a musical piece may be generated at different times by each user storing their component. Each user may store their portion locally or in a memory location accessed via network 105.

Figure 8:
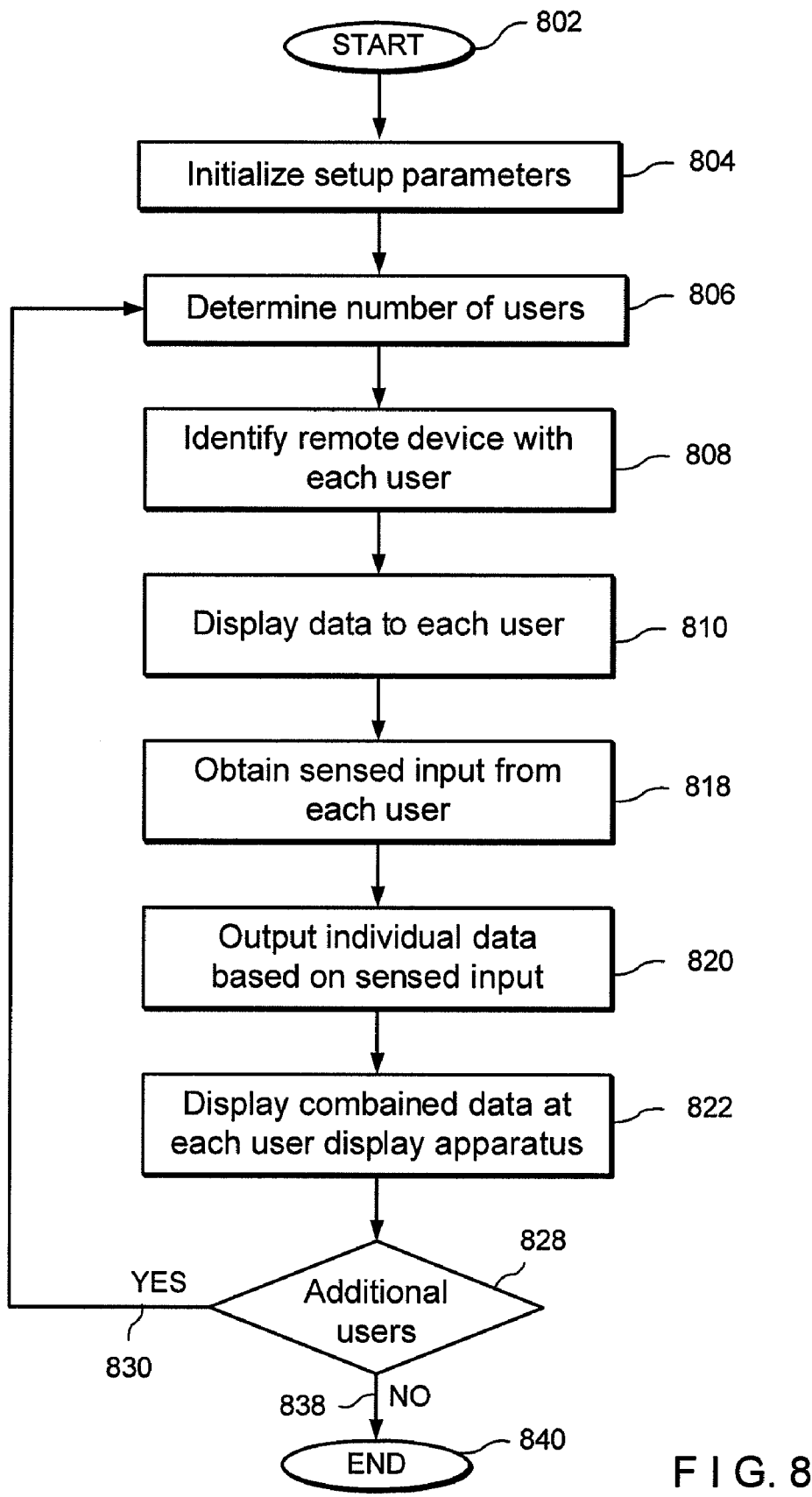
FIG. 8 shows a flowchart of steps to implement another embodiment of the present invention.

FIG. 8 shows a flowchart 800 of steps to implement another embodiment of the present invention. Flowchart 800 is a series of steps that may be executed by a processor, or otherwise executed to perform the identified functions and may also be stored in one or more memories. For example, the steps of FIG. 8 may be stored on a computer-readable medium, such as ROM, RAM, EEPROM, CD, DVD, or other non-volatile memory. The program code stored on an electronic memory medium is a structural element. The flowchart 800 illustrates an embodiment in which multiple users are simultaneously playing the same game and interacting.

The process 800 begins with start step 802. Initialization of the multiple user interaction is performed in step 804. A determination of the number of users, or participates is shown in step 806. During this determination step, each user may be assigned, or permitted to select, which instrument or vocals they wish to use.

An identification of a secondary device for each user is made in step 808. Each user may be associated with a corresponding device, such as a PSP®. This enables a host device to provide the appropriate information for each user.

Data, for each user, is displayed on the corresponding secondary device, as shown in step 810. This data may be for example, drum music for a user playing drums, guitar music for a user playing guitar and vocal data for a singer.

Input data is gathered from each user, as shown in step 818. The input data indicates the music or voice data generated by the particular user. This data is typically generated as a result of motion or sound detection by sensors on the accessory of each user.

A representation of the data generated by each user, typically audio data, is displayed, as shown in step 820. A combined output, which reflects the contribution of each user is collected and output to the other users, as shown in step 822. Thus, the experience of a band performing may be replicated.

A determination of whether to add additional users is made in step 828. If additional users are to be added, "yes" line 830 leads to step 806. If no additional users are to be added, "no" line 838 leads to end step 840.

Figure 9:
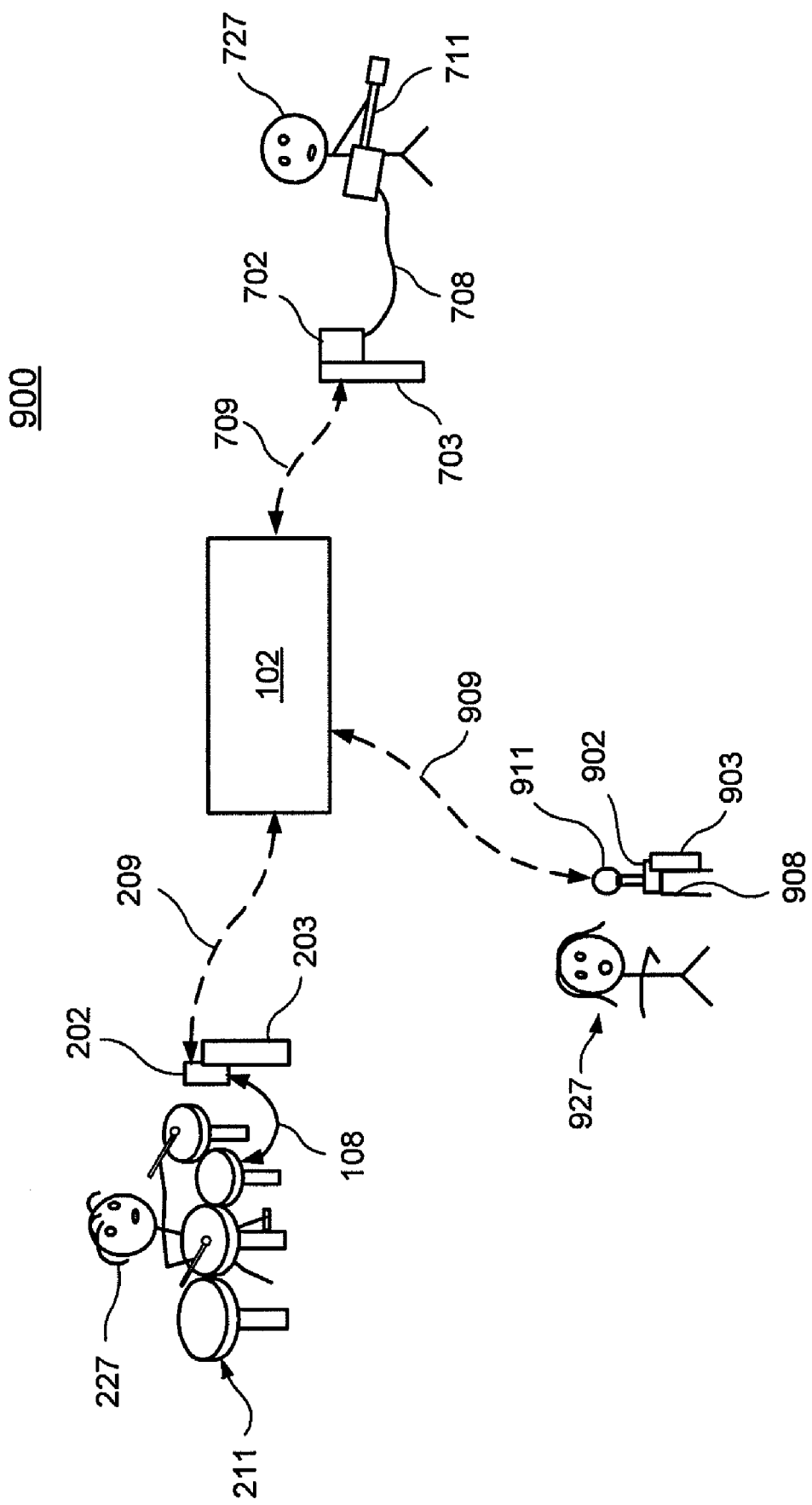
FIG. 9 shows an embodiment of multiple users using a single host device.

FIG. 9 shows an embodiment of multiple users using a single host device. For example, a user with an associated PSP device, participating in a game session with other users may only wish to view information relevant to their part of the musical number. FIG. 9 illustrates that a user may view their music data as well as other data, such as a timer that facilitates their participation. The embodiment shown in FIG. 9 is similar to the embodiment shown in FIG. 7 except a single host device 102 is used by all users (227, 727 and 927 ) and their associated secondary devices (202, 702 and 902, respectively). The other elements have been described in relation to FIG. 7 and are not repeated in relation to FIG. 9.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A system comprising:
    a first module adapted to receive data from a remote location;
    one or more second modules, adapted to receive data provided by the first module and to process data;
    one or more controllers, coupled to an associated second module, each of the one or more controllers adapted to provide control input data to the associated second module;
    wherein the one or more second modules each have one or more input modules adapted to receive the control input data;
    wherein the one or more second modules each have one or more output modules adapted to output processed data that is specific to a particular one of the one or more second modules based on the control input data received from the associated controller, and
    wherein the one or more second modules are adapted to compare the control input data received from the associated controller to the data provided by the first module.

2. The system as claimed in claim 1, wherein the one or more second modules transmit signals to the first module.

3. The system as claimed in claim 2, wherein the transmission of signals is via a wireless connection or a wired connection.

4. The system as claimed in claim 1, wherein the input module is adapted to receive the control input data via a wireless connection between the one or more controllers and the one or more second modules.

5. The system as claimed in claim 1, wherein the input module is a wired port.

6. The system as claimed in claim 1, wherein the one or more controllers are motion sensitive and the control input data is a function of sensed motion.

7. The system as claimed in claim 1, wherein the input from the first module to the one or more second modules is via a wireless link.

8. The system as claimed in claim 1, wherein the input from the first module to the one or more second modules is a representation of musical notes.

9. The system as claimed in claim 3, wherein the representation of musical notes corresponds to music selected from the group consisting of guitar music and drum music.

10. The system as claimed in claim 1, further comprising:
    a supporting unit adapted to support the one or more second modules.

11. The system as claimed in claim 10, wherein the supporting unit is adapted to swivel from a first position to a second position, the second position being perpendicular to the first position.

12. The system as claimed in claim 1 wherein the one or more output modules comprises a display screen.

13. The system as claimed in claim 12 wherein the display screen has zooming functionality.

14. The system as claimed in claim 1 wherein the one or more output modules comprises a speaker.

15. The system as claimed in claim 1 wherein the one or more output modules comprises a wireless port.

16. The system as claimed in claim 1, wherein the one or more input modules comprises a microphone.

17. The system as claimed in claim 1, wherein the one or more input modules comprises a Wi-Fi port.

18. The system as claimed in claim 1, wherein the one or more second modules are adapted to store data.

19. The system as claimed in claim 1, wherein one or more output modules are adapted to output display data at an orientation specified by the first module.

20. A system comprising:
    a first module adapted to receive data from a remote location;
    one or more second modules, adapted to receive data provided by the first module;
    one or more controllers, coupled to an associated second module, each of the one or more controllers adapted to provide control input data to the associated second module;
    wherein the one or more second modules each have one or more input modules adapted to receive the control input data;
    wherein the one or more second modules each have one or more output modules adapted to output data that is specific to a particular one of the one or more second modules based on the control input data received from the associated controller,
    wherein the one or more second modules are adapted to compare the control input data received from the associated controller to the data provided by the first module,
    wherein the one or more second modules transmit signals to the first module via a wireless transmission link.

21. A system comprising:
    a first module adapted to receive data from a remote location;
    one or more second modules, adapted to receive data provided by the first module;

one or more controllers, coupled to an associated second module, each of the one or more controllers adapted to provide control input data to the associated second module;

wherein the one or more second modules each have one or more input modules adapted to receive the control input data;

wherein the one or more second modules each have one or more output modules adapted to output data that is specific to a particular one of the one or more second modules based on the control input data received from the associated controller, wherein the one or more second modules are adapted to compare the control input data received from the associated controller to the data provided by the first module, wherein the one or more second modules transmit signals to the first module via program code stored on the one or more second modules.

22. The system as claimed in claim 1, wherein the first module determines operation of the one or more second modules.

23. The system as claimed in claim 1, wherein the one or more output modules include a display unit.

* * * * *